United States Patent Office 3,541,143
Patented Nov. 17, 1970

3,541,143
PROCESS FOR THE PREPARATION
OF ACRYLIC ACID
Mamoru Nakano, Isao Komuro, Kenichi Nagai, and Bunzi Oshida, Kawasaki-shi, Japan, assignors to Mitsubishi Petrochemical Co., Ltd., Chiyoda-ku, Tokyo, Japan, a corporation of Japan
No Drawing. Filed Aug. 29, 1967, Ser. No. 663,963
Claims priority, application Japan, Sept. 7, 1966, 41/59,054
Int. Cl. C07c 51/26
U.S. Cl. 260—530                              6 Claims

ABSTRACT OF THE DISCLOSURE

A process for the preparation of acrylic acid which comprises contacting acrolein with molecular oxygen in vapor phase at the temperature ranging 250–500° C., in the presence of a solid catalyst containing vanadium, antimony, titanium, phosphorus and/or tellurium and oxygen.

---

This invention relates to a process for the preparation of acrylic acid by catalytic vapor phase oxidation of acrolein. More particularly the invention relates to a process for the preparation of acrylic acid from acrolein, characterized mainly by the use of a novel catalyst.

Preparation of acrylic acid by catalytic vapor phase oxidation of acrolein is already known. And, it is also known that, for the industrially advantageous progress of the catalytic vapor phase reaction, use of good catalyst is of the primary importance.

In the past we disclosed that a catalyst containing vanadium, antimony and oxygen is effective for the conversion of acrolein to acrylic acid by catalytic vapor phase reaction (French Pat. No. 1,412,880). Again, it has been also proposed from a different source that a catalyst containing vanadium, antimony, phosphorus and oxygen is useful in the preparation of acrylic acid by oxidation of acrolein with molecular oxygen (British Pat. No. 991,836).

However, in the reaction systems using those catalysts, one pass yields of acrylic acid are low, and the catalyst lives are short. In view of these deficiencies, the catalysts are not very satisfying for industrial use in the catalytic vapor phase reaction of acrolein.

The object of the present invention is therefore to remove those unsatisfactory points in the known catalysts, which is achieved by the use of a catalyst containing vanadium, antimony, titanium, phosphorus and/or tellurium and oxygen. The catalyst of the invention achieves indeed a surprising improvement over the said known catalysts, in the points that not only the one pass yield is high, but also the catalyst life is long and stable catalytic activity is obtained.

The catalyst of the invention can be prepared by any of the methods conventionally employed for the described type of catalyst, so far as the point is secured that its essential components are vanadium, antimony, titanium, phosphorus and/or tellurium and oxygen. For an instance, the catalyst of the invention can be prepared by evaporation to dryness of a solution or suspension, particularly an aqueous solution, containing as dissolved or suspended therein vanadium, antimony, titanium, and phosphorus and/or tellurium in elementary form or as compounds, particularly oxide or such compounds which decompose at temperatures below 600° C. to become oxide, and calcining the resultant powdery solid at suitable temperatures, for example, 300–650° C. in the air. The calcination product can be ground or shaped into tablets according to the purpose of use. It is also possible to improve the reactivity or selectivity of the catalyst, or its mechanical or thermal strength, by addition thereto, at a suitable stage of the above catalyst preparation, of a suitable carrier such as, for example, silica, alumina, diatomaceous earth, Carborundum, zirconium oxide, pumice and the like. While any carrier which is inert or of low activity in this type of oxidation reaction can be used, normally those having relatively small surface areas (e.g. below 50 m.$^2$/g.) are preferred.

Again in the preparation of the solution or suspension containing the said elements of vanadium, antimony, titanium and phosphorus and/or tellurium, a substance which decomposes or volatilizes upon calcination in the air at 300° C. or above and does not remain in the catalyst, such as nitric acid, oxalic acid, hydrochloric acid, ammonia or amine, may be used as the solvent or dispersing agent, or may be added to the system separately. By such means the surface area of the catalyst can be controlled within a certain range, and consequently the activity and selectivity of the catalyst may be favorably affected.

The atom ratio of the said four or five components, viz., vanadium, antimony, titanium and phosphorus and/ or tellurium can be suitably selected by the user depending on the specific conditions or purpose for the use of the catalyst. Generally speaking, however, the atom ratios within the range of:

$$V:Sb:P:Ti = (1) : (2-40) : (1-80) : (5-400)$$

or $$V:Sb:Te:Ti = (1) : (2-40) : (1-80) : (5-400)$$

are preferred.

Also when both phosphorus and tellurium are put into the catalyst, the total content of the two elements should preferably be within the above range specified for either of the elements alone.

The highly important characteristics of the catalyst of the invention is that the same contains titanium component. The catalyst in which the atom ratio of vanadium plus antimony to titanium lies within the range satisfying the equation below:

$$(Ti) : (V+Sb) = (2-20) : (1)$$

gives particularly satisfactory result. According to our researches, with the titanium (Ti) content outside the above-specified range certain undesirable tendencies are observed. To wit, when it is less, catalytic activity of the catalyst is degraded, and when it is more, its selectivity for the acrylic acid formation is decreased.

Also the atom ratio between vanadium and antimony has an important bearing on the selectivity for acrylic acid, the maximum point of the said selectivity being achieved at the vicinity of $V:Sb = (1) : (3-20)$, inter alia, $(1):(7-10)$.

Incidentally, the chemical structure with which the said four or five metallic components constituting the catalyst of the invention are present in the same catalyst is not entirely clear, nor the inventive value of the invention should be affected by such microscopic aspect. Generally it can be presumed, however, that the catalyst may be a mixture of oxides of vanadium, antimony, titanium and phosphorus and/or tellurium, or may be a compound formed by mutual reaction of some of those components, or a mixture of such compounds.

Furthermore the catalyst employed in this invention may contain, besides the aforesaid four or five essential components, each minor amount of such other elements as bismuth, strontium, molybdenum and tungsten.

While addition of such other elements does not bring about particularly notable advantages, in certain cases it contributes to somewhat increase the space time yield without appreciably affecting the selective activity of the catalyst.

The reaction conditions to be employed for the process of the invention are essentially the same to those conventionally employed for the catalytic vapor phase oxidation of acrolein, except that the catalyst is novel as far described. Accordingly, the catalytic oxidation can be performed at reduced, atmospheric or elevated pressure with heating, in the system in which, besides acrolein which is the reactant gas and molecular oxygen, other agents such as a diluent, an antioxidant to prevent perfect oxidation, a polymerization-inhibitor to prevent polymerization of the reaction product (quinones, phenols) and the like may be present if desired. Industrially inert gases such as nitrogen, carbon dioxide and steam may be added for the above-described purpose with advantage. Particularly, use of a gaseous mixture of acrolein, air and steam is advantageous. The preferred reaction temperature lies in the order of 250–500° C., the reaction temperature to give the maximum acrylic acid yield normally being between 300–450° C.

The gaseous reaction product is cooled, and from which the object acrylic acid can be recovered by suitable means such as, for example, condensation and solvent washing.

REFERENCE EXAMPLE 1

As an example of such catalysts which contain none of phosphorus, tellurium and titanium but otherwise are similar to the catalyst of the invention, a catalyst was prepared by the steps of mixing an aqueous solution of ammonium metavanadate and an aqua regia solution of antimony oxide to bring about the atom ratio of $V:Sb=1:9$ in the mixture, evaporating the system to dryness with agitation, calcining the product in the air for 10 hours at 540° C., and compressing the same into tablets. And, the tablets were used as the catalyst in the following reaction.

The oxidation of acrolein was practiced by contacting a gaseous mixture composed of 1 vol. percent of acrolein, 49 vol. percent of air and 50 vol. percent of steam with the catalyst in a quartz reactor (inner diameter, 35 mm.). The contact time in this case was about 5.7 seconds (25° C. atmospheric pressure). The results are shown in Table 1 below.

TABLE 1

| Reaction temperature (° C.) | Acrolein conversion (percent) | Selectivity (mol percent) | | |
|---|---|---|---|---|
| | | Acrylic acid | Acetic acid | Carbon dioxide |
| 275 | 31.1 | 57.2 | 5.3 | 37.2 |
| 300 | 41.5 | 25.4 | 2.3 | 72.4 |

REFERENCE EXAMPLE 2

As an example of using a catalyst which is similar to the catalyst of the invention except that its titanium content is zero, a catalyst prepared as follows was employed in the reaction below. To wit, an aqueous solution of amonium metavanadate, an aqua regia solution of antimony oxide and phosphoric acid ($H_3PO_4$) were mixed to bring about the atom ratio of $V:Sb:P=1:9:5$ in the mixture, and the system was evaporated to dryness with agitation, followed by calcination at 540° C. for 10 hours in the air. The product was then compressed into tablets. The specific surface area of the catalyst measured in accordance with BET method was about 10 m.²/g.

The oxidation reaction of acrolein was run by contacting a gaseous mixture composed of 1 vol. percent of acrolein, 49 vol. percent of air and 50 vol. percent of steam with the catalyst in a quartz reactor (inner diameter, 35 mm.). The reaction temperature was 325° C. The results of the experiments are given in Table 2, in which the contact time was that measured at 25° C. under atmospheric pressure.

TABLE 2

| Contact time (sec.) | Acrolein conversion (percent) | Selectivity (mol percent) | | |
|---|---|---|---|---|
| | | Acrylic acid | Acetic acid | Carbon dioxide |
| 5.4 | 47.0 | 87.4 | 10.1 | 0.1 |
| 10.8 | 59.1 | 75.6 | 13.4 | 7.6 |
| 21.2 | 64.6 | 59.8 | 15.4 | 24.8 |
| 32.5 | 62.5 | 44.3 | 17.6 | 38.2 |

REFERENCE EXAMPLE 3

As an example of using a catalyst which is similar to the catalyst of the invention except that it contains no phosphorus, a catalyst prepared in the following manner was employed in the reaction below. To wit, an aqueous solution of ammonium metavanadate, an aqua regia solution of antimony oxide ($Sb_2O_3$) and solid titanium oxide were mixed to bring about the atom ratio of $$V:Sb:Ti=2:8:100$$

in the mixture, and the system was evaporated to dryness with agitation. The remaining solid was calcined at 540° C. for 10 hours in the air, and compressed into tablets. The specific surface area of the catalyst measured in accordance with BET method was about 12 m.²/g.

The oxidation reaction of acrolein was practiced by contacting a gaseous mixture composed of 1 vol. percent of acrolein, 49 vol. percent of air and 50 vol. percent of steam with the catalyst in a quartz reactor (inner diameter, 35 mm.) at a reaction temperature of 325° C. The results obtained are given in Table 3, in which the contact time is the value at 25° C. and atmospheric pressure.

TABLE 3

| Contact time (sec.) | Acrolein conversion (percent) | Selectivity (mol percent) | | |
|---|---|---|---|---|
| | | Acrylic acid | Acetic acid | Carbon dioxide |
| 5.4 | 48.0 | 20.7 | 22.2 | 57.1 |
| 3.3 | 44.7 | 35.3 | 25.1 | 39.5 |
| 2.4 | 45.6 | 49.1 | 22.6 | 28.3 |
| 1.7 | 40.9 | 56.3 | 20.6 | 20.6 |
| 1.0 | 33.7 | 65.7 | 19.7 | 14.6 |

EXAMPLE 1

An aqueous solution of ammonium metavanadate, an aqua regia solution of antimony oxide ($Sb_2O_3$), phosphoric acid ($H_3PO_4$) and titanium oxide ($TiO_2$) were mixed to bring about the atom ratio of $$V:Sb:P:Ti=1:9:5:100$$

in the mixture, and the system was evaporated to dryness with agitation. The remaining solid was calcined at 540° C. for 10 hours in the air, and compressed into tablets to be used as the catalyst. The specific surface area of the catalyst measured in accordance with BET method was about 8 m.²/g.

The oxidation reaction of acrolein was performed by contacting a gaseous mixture composed of 1 vol. percent of acrolein, 49 vol. percent of air and 50 vol. percent of steam with the catalyst of the invention prepared as in the above, in a quartz reactor (inner diameter, 35 mm.). The reaction temperature was 325° C. The results of the experiments are given in Table 4 below, in which the contact time is the value at 25° C. under atmospheric pressure.

TABLE 4

| Contact time (sec.) | Acrolein conversion (percent) | Selectivity (mol percent) | | |
|---|---|---|---|---|
| | | Acrylic acid | Acetic acid | Carbon dioxide |
| 5.4 | 33.9 | 86.8 | 9.9 | 0.0 |
| 10.8 | 50.2 | 86.6 | 12.6 | 0.7 |
| 21.2 | 60.4 | 79.6 | 12.6 | 7.8 |
| 32.7 | 79.1 | 75.6 | 13.8 | 10.7 |

EXAMPLE 2

Oxidation reaction of acrolein was performed using the same catalyst under the same reaction conditions as employed in Example 1, with the contact time of 10.8 seconds (25° C., atmospheric pressure) at varied reaction temperatures. The results are given in Table 5 below.

TABLE 5

| Reaction temperature (° C.) | Acrolein conversion (percent) | Selectivity (mol percent) | | |
|---|---|---|---|---|
| | | Acrylic acid | Acetic acid | Carbon dioxide |
| 275 | 41.1 | 72.5 | 20.6 | <0.1 |
| 300 | 44.5 | 80.9 | 14.9 | <0.1 |
| 325 | 50.2 | 87.6 | 12.6 | 0.7 |
| 350 | 59.7 | 87.3 | 10.0 | 2.7 |
| 375 | 60.7 | 83.1 | 7.1 | 9.8 |
| 400 | 65.5 | 71.1 | 8.0 | 20.8 |

EXAMPLE 3

Oxidation reaction of acrolein was performed using the same catalyst under the same reaction conditions as employed in Example 1, with the contact time of 21.2 seconds (25° C., atmospheric pressure) at varied reaction temperatures. The results are given in Table 6.

TABLE 6

| Reaction temperature (° C.) | Acrolein conversion (percent) | Selectivity (mol percent) | | |
|---|---|---|---|---|
| | | Acrylic acid | Acetic acid | Carbon dioxide |
| 350 | 85.3 | 80.6 | 10.7 | 8.6 |
| 375 | 91.1 | 71.1 | 8.2 | 20.8 |

EXAMPLE 4

An aqueous solution of ammonium metavanadate, an aqua regia solution of antimony oxide ($Sb_2O_3$), an aqua regia solution of tellurium and titanium oxide ($TiO_2$) were mixed to bring about the atom ratio of $$V:Sb:Te:Ti=1:9:1.5:100$$

in the mixture, and the system was evaporated to dryness with agitation. The remaining solid was calcined at 540° C. for 10 hours in the air, and compressed into tablets to be used as the catalyst. The specific surface area of the catalyst measured in accordance with BET method was about 10 m.$^2$/g.

The oxidation reaction of acrolein was practiced by contacting a gaseous mixture composed of 1 vol. percent of acrolein, 49 vol. percent of air and 50 vol. percent of steam with the said catalyst in a quartz reactor (inner diameter, 35 mm.). The reaction temperature was 300° C. The results are given in Table 7, in which the contact time is the value at 25° C. and atmospheric pressure.

TABLE 7

| Contact time (sec.) | Acrolein conversion (percent) | Selectivity (mol percent) | | |
|---|---|---|---|---|
| | | Acrylic acid | Acetic acid | Carbon dioxide |
| 5.4 | 42.3 | 78.9 | 11.1 | 4.5 |
| 10.8 | 68.7 | 63.9 | 10.8 | 25.2 |
| 16.4 | 68.8 | 62.8 | 15.3 | 21.8 |
| 21.2 | 71.4 | 51.4 | 18.3 | 30.4 |

EXAMPLE 5

An aqueous solution of ammonium metavanadate, an aqua regia solution of antimony oxide ($Sb_2O_3$), phosphoric acid ($H_3PO_4$) and titanium oxide ($TiO_2$) were mixed to bring about the atom ratio of $$V:Sb:P:Ti=1:7.5:5:100$$

in the resultant mixture, and the system was evaporated to dryness with agitation, followed by calcination at 500° C. for 10 hours in the air. The calcined product was then compressed into tablets to be used as the catalyst. The specific surface area of the catalyst measured in accordance with BET method was about 11 m.$^2$/g.

The oxidation reaction of acrolein was performed by mixing acrolein with a gaseous mixture having a composition of air/steam=2 by volume at atmospheric pressure, and contacting the resultant mixture with the catalyst in a quartz reactor (inner diameter, 35 mm.). The reaction temperature was 325° C. and the contact time, 7.2 seconds (25° C. atmospheric pressure). The results obtained are given in Table 8 below.

TABLE 8

| Acrolein concentration in the introduced gas (vol. percent) | Acrolein conversion (percent) | Selectivity (mol percent) | | |
|---|---|---|---|---|
| | | Acrylic acid | Acetic acid | Carbon dioxide |
| 0.5 | 55.2 | 88.1 | 1.3 | 10.5 |
| 0.8 | 49.2 | 78.7 | 12.9 | 9.0 |
| 1.1 | 46.4 | 76.5 | 11.8 | 11.7 |
| 2.0 | 47.6 | 74.6 | 13.4 | 11.4 |

EXAMPLE 6

An aqueous solution of ammonium metavanadate, an aqua regia solution of antimony oxide ($Sb_2O_3$), phosphoric acid ($H_3PO_4$) and titanium oxide were mixed to bring about the atom ratio of V:Sb:P:Ti=2:8:5:100 in the resultant mixture, and the system was evaporated to dryness with agitation, followed by calcination at 540° C. for 10 hours in the air. The calcined product was then compressed into tablets to be used as the catalyst. The specific surface area of the catalyst measured in accordance with BET method was about 12 m.$^2$/g.

The oxidation reaction of acrolein was performed by introducing a gaseous mixture composed of 1 vol. percent of acrolein, 49 vol. percent of air and 50 vol. percent of steam into a quartz reactor (inner diameter, 35 mm.), and contacting the same with the above catalyst of the invention. The results obtained are given in Table 9, in which the contact time is the value of 25° C. and atmospheric pressure.

TABLE 9

| Contact time (sec.) | Reaction temperature (° C.) | Acrolein conversion (percent) | Selectivity (mol percent) | | |
|---|---|---|---|---|---|
| | | | Acrylic acid | Acetic acid | Carbon dioxide |
| 8.4 | 325 | 45.5 | 81.8 | 14.9 | 3.3 |
| 5.4 | 325 | 40.0 | 80.8 | 17.1 | 2.0 |
| 3.3 | 325 | 31.0 | 84.6 | 16.3 | 0.1 |

EXAMPLE 7

An aqueous solution of ammonium metavanadate, an aqua regia solution of antimony oxide ($Sb_2O_3$), phosphoric acid ($H_3PO_4$), titanium oxide ($TiO_2$) and an aqueous solution of bismuth nitrate were mixed to bring about the atom ratio of $$V:Sb:P:Ti:Bi=2:8:2:100:1$$

in the resultant mixture, and the system was evaporated to dryness with agitation. The remaining solid was calcined at 540° C. for 10 hours in the air, and compressed into tablets to be used as the catalyst. The specific surface area of the catalyst measured in accordance with BET method was about 10 m.$^2$/g.

The oxidation reaction of acrolein was practiced by contacting a gaseous mixture composed of 1 vol. percent of acrolein, 49 vol. percent of air and 50 vol. percent of steam with the catalyst in a quartz reactor (inner diameter, 35 mm.). The reaction temperature was 325° C. The results obtained are given in Table 10 below, in which the contact time is the value at 25° C. and atmospheric pressure.

TABLE 10

| Contact time (sec.) | Acrolein conversion (percent) | Selectivity (mol percent) | | |
|---|---|---|---|---|
| | | Acrylic acid | Acetic acid | Carbon dioxide |
| 8.4 | 48.7 | 81.6 | 13.1 | 5.8 |
| 5.4 | 50.4 | 79.6 | 15.7 | 4.8 |

EXAMPLE 8

An aqueous solution of ammonium metavanadate, an aqua regia solution of antimony oxide ($Sb_2O_3$), phosphoric acid ($H_3PO_4$), titanium oxide ($TiO_2$) and an aqueous solution of strontium nitrate were mixed to bring about the atom ratio of V:Sb:P:Ti:Sr=1:9:1:100:0.5 in the resultant mixture, and the system was evaporated to dryness with agitation. Thus obtained solid was calcined at 540° C. for 10 hours in the air, and compressed into tablets to be used as the catalyst. The specific surface area of the catalyst measured in accordance with BET method was about 15 m.²/g.

The oxidation reaction of acrolein was practiced by introducing a gaseous mixture composed of 1 vol. percent of acrolein, 49 vol. percent of air and 50 vol. percent of steam into a quartz reactor (inner diameter, 35 mm.) and thereby contacting the same with the said catalyst. The results obtained are given in Table 11 below, in which the contact time is the value at 25° C. and atmospheric pressure.

TABLE 11

| Contact time (sec.) | Reaction temperature (° C.) | Acrolein conversion (percent) | Selectivity (mol percent) | | |
|---|---|---|---|---|---|
| | | | Acrylic acid | Acetic acid | Carbon dioxide |
| 5.4 | 325 | 36.2 | 67.4 | 6.7 | 8.4 |
| 8.4 | 325 | 40.6 | 68.3 | 5.8 | 19.4 |

EXAMPLE 9

An aqueous solution of ammonium metavanadate, an aqua regia solution of antimony oxide. ($Sb_2O_3$), phosphoric acid ($H_3PO_4$), an aqua regia solution of tellurium and titanium oxide ($TiO_2$) were mixed so as to bring about the atom ratio of V:Sb:P:Te:Ti=1:9:2:2:140, the mixture was evaporated to dryness and solification with agitation, calcined at 350° C. for 1 hour in the air, thereafter compressed into tablets, calcined at a predetermined temperature for 3 hours in the air, respectively to be used as catalyst.

The oxidation reaction of acrolein was practiced by contacting a gaseous mixture composed of 1 vol. percent of acrolein, 49 vol. percent of air and 50 vol. percent of steam with the catalyst in a quartz reactor (inner diameter: 35 mm.). The contact time was 11.6 seconds at 25° C. under atmospheric pressure.

TABLE 12

| Calcining temperature of catalyst (° C.) | Acrolein conversion (percent) | Selectivity (mol percent) | | | Specific surface area of BET (m.²/g.) |
|---|---|---|---|---|---|
| | | Acrylic acid | Acetic acid | Carbon dioxide | |
| 350 | 89.6 | 83.3 | 14.1 | 1.4 | 8.8 |
| 400 | 38.5 | 80.4 | 15.8 | 1.2 | 7.9 |
| 600 | 41.6 | 78.4 | 14.9 | 6.7 | 10.0 |
| 650 | 47.1 | 54.4 | 17.5 | 28.1 | 10.7 |
| 700 | 29.5 | 68.8 | 5.3 | 25.9 | 5.6 |

EXAMPLE 10

An aqueous solution of ammonium metavanadate, an aqua regia solution of antimony oxide ($Sb_2O_3$), phosphoric acid ($H_3PO_4$) and titanium oxide ($TiO_2$) were mixed so as to bring about the atom ratio of V:Sb:P:Ti=1:3:10:20 the mixture was evaporated to dryness and solidification with agitation, calcined at 540° C. for 10 hours in the air, compressed into tablets to be used as catalyst. The specific surface area of BET of this catalyst was about 4 m.²/g.

The oxidation reaction of acrolein was practiced by contacting a gaseous mixture composed of 1 vol. percent of acrolein, 52 vol. percent of air and 47 vol. percent of steam with the catalyst in a quartz reactor (inner diameter: 35 mm.). The contact time was 11.6 seconds at 25° C. under atmospheric pressure. 15.8% of the introduced acrolein reacted and of the reacted acrolein, 69.0 mol percent was converted to acrylic acid and 28 mol percent was converted to acetic acid.

EXAMPLE 11

An aqueous solution of ammonium vanadate, an aqua regia solution of antimony oxide ($Sb_2O_3$), phosphoric acid ($H_3PO_4$) and titanium oxide were mixed so as to bring about the atom ratio of V:Sb:P:Ti=1:30:20:70, the mixture was evaporated to dryness and solidification with agitation, calcined at 540° C. for 1 hour in the air, thereafter compressed into tablets to be used as catalyst. The specific surface area of BET of this catalyst was about 3 m.²/g.

The oxidation reaction of acrolein was practiced by contacting a gaseous mixture composed of 1 vol. percent of acrolein, 52 vol. percent of air and 47 vol. percent of steam with the catalyst at a reaction temperature of 375° C. in a quartz reactor (inner diameter: 35 mm.) The contact time was 11.6 seconds at 25° C. under atmospheric pressure.

20% of the introduced acrolein reacted, and of the reacted acrolein, 84.4% was converted to acrylic acid and 14.4% was converted to acetic acid.

What is claimed is:

1. A process for the preparation of acrylic acid which comprises contacting acrolein with molecular oxygen in vapor phase at the temperature ranging 250–500° C., in the presence of a solid catalyst consisting essentially of vanadium, antimony, titanium, phosphorous and/or tellurium and oxygen.

2. The process according to claim 1 in which the atom ratio of vanadium (V), antimony (Sb), titanium (Ti) and phosphorous (P) and/or tellurium (Te) in the solid catalyst lies within the range of:

V:Sb:Ti:(P and/or Te)=(1):(2–40):(5–400):(1–80)

3. The process according to claim 1 in which the atom ratio of vanadium (V), antimony (Sb), titanium (Ti) and phosphorus (P) and/or tellurium (Te) in the solid catalyst lies within the range of:

V:Sb:Ti:(P and/or Te)=(1):(2–40):(5–400):(1–80)

and furthermore the atom ratio of the total amount of vanadium (V) and antimony (Sb) to titanium (Ti) lies within the range of:

(Ti):(V+Sb)=(2–20):(1)

4. The process according to claim 1 in which acrolein is contacted with molecular oxygen together with at least one inert gas selected from the group consisting of nitrogen, carbon dioxide and steam.

5. The process of claim 1 in which the reaction temperature is 300–450° C.

6. A process for the preparation of acrylic acid which comprises contacting acrolein with molecular oxygen in vapor phase at a temperature from 250 to 500° C. in the presence of a catalyst consisting of vanadium, antimony, titanium, phosphorus and/or tellurium and oxygen and at least one member of the group consisting of bismuth (Bi), strontium (Sr), molybdenum (Mo) and tungsten (W).

References Cited

FOREIGN PATENTS 903,034 8/1962 Great Britain.
1,106,648 3/1968 Great Britain.

LORRAINE A. WEINBERGER, Primary Examiner

D. E. STENZEL, Assistant Examiner

U.S. Cl. X.R.

252—437